(12) United States Patent
Benslimane et al.

(10) Patent No.: US 12,024,993 B2
(45) Date of Patent: Jul. 2, 2024

(54) DETECTING DEFECTS IN TUBULAR STRUCTURES

(71) Applicant: Schlumberger Technology Corporation, Sugar Land, TX (US)

(72) Inventors: Salma Benslimane, Clamart (FR); Josselin Kherroubi, Clamart (FR); Jean-Luc Le Calvez, Clamart (FR); Ram Sunder Kalyanraman, Richmond, TX (US); Mikhail Lemarenko, Beijing (CN); Thomas Berard, Clamart (FR); Kamaljeet Singh, Bucharest (RO)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 413 days.

(21) Appl. No.: 17/539,233

(22) Filed: Dec. 1, 2021

(65) Prior Publication Data

US 2023/0167732 A1 Jun. 1, 2023

(51) Int. Cl.
*E21B 47/002* (2012.01)
*E21B 47/00* (2012.01)
(Continued)

(52) U.S. Cl.
CPC ........ *E21B 47/0025* (2020.05); *E21B 47/006* (2020.05); *E21B 47/007* (2020.05);
(Continued)

(58) Field of Classification Search
CPC .. E21B 47/0025; E21B 47/006; E21B 47/007; E21B 2200/22; G06T 7/001;
(Continued)

(56) References Cited

U.S. PATENT DOCUMENTS

| 11,029,283 B2* | 6/2021 | Zheng | G01N 27/83 |
| 2003/0118230 A1* | 6/2003 | Song | E21B 19/22 382/152 |

(Continued)

FOREIGN PATENT DOCUMENTS

CN 110821473 A 2/2020

OTHER PUBLICATIONS

International Search Report and Written Opinion issued in International Patent application PCT/US2022/049409 on Apr. 4, 2023, 9 pages.

*Primary Examiner* — Roy M Punnoose
(74) *Attorney, Agent, or Firm* — Jeffrey D. Frantz

(57) ABSTRACT

A system and method for detecting defects in a tubular structure installed in a wellbore extending into a subterranean formation. An input image of the tubular structure contains input data indicative of a characteristic of the tubular structure. A background image is determined based on the input image. The background image contains background data indicative of the characteristic of the tubular structure associated with manufacturing of the tubular structure. A defect image is determined based on a difference between the input image and the background image. The defect image contains defect data indicative of the characteristic of the tubular structure associated with defects in the tubular structure.

20 Claims, 8 Drawing Sheets

(51) Int. Cl.
*E21B 47/007* (2012.01)
*G06T 7/00* (2017.01)

(52) U.S. Cl.
CPC ............... *G06T 7/001* (2013.01); *G06T 7/97* (2017.01); *G06T 2207/30136* (2013.01)

(58) Field of Classification Search
CPC ............ G06T 7/97; G06T 2207/30136; G06T 2207/20016; G06T 2207/20081; G06T 2207/20084
See application file for complete search history.

(56) References Cited

U.S. PATENT DOCUMENTS

| | | |
|---|---|---|
| 2015/0338541 A1 | 11/2015 | Nichols et al. |
| 2016/0161627 A1* | 6/2016 | Khalaj Amineh .... E21B 47/006 702/6 |
| 2017/0261469 A1* | 9/2017 | Chang ................... E21B 47/006 |
| 2018/0017707 A1 | 1/2018 | Kuo et al. |
| 2019/0153856 A1* | 5/2019 | San Martin .......... G05B 19/042 |
| 2019/0339210 A1* | 11/2019 | Stewart ................. G01M 3/007 |
| 2021/0040838 A1* | 2/2021 | Manders ............. E21B 47/0025 |
| 2022/0178244 A1* | 6/2022 | Fouda ................ E21B 47/0025 |
| 2022/0178245 A1* | 6/2022 | Fouda ................... G06N 3/045 |

\* cited by examiner

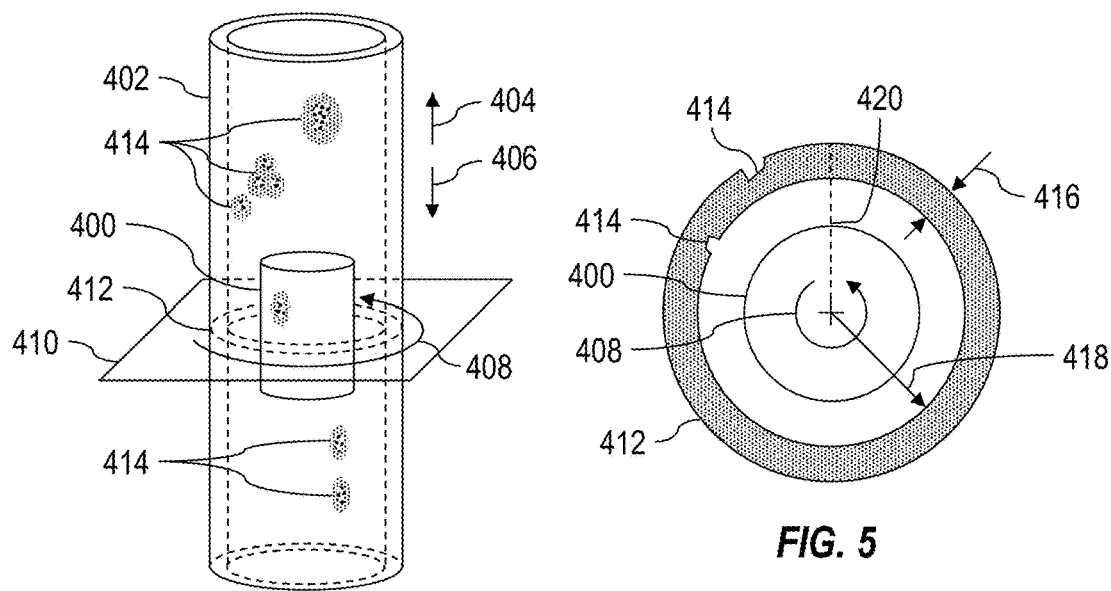
FIG. 4
FIG. 5
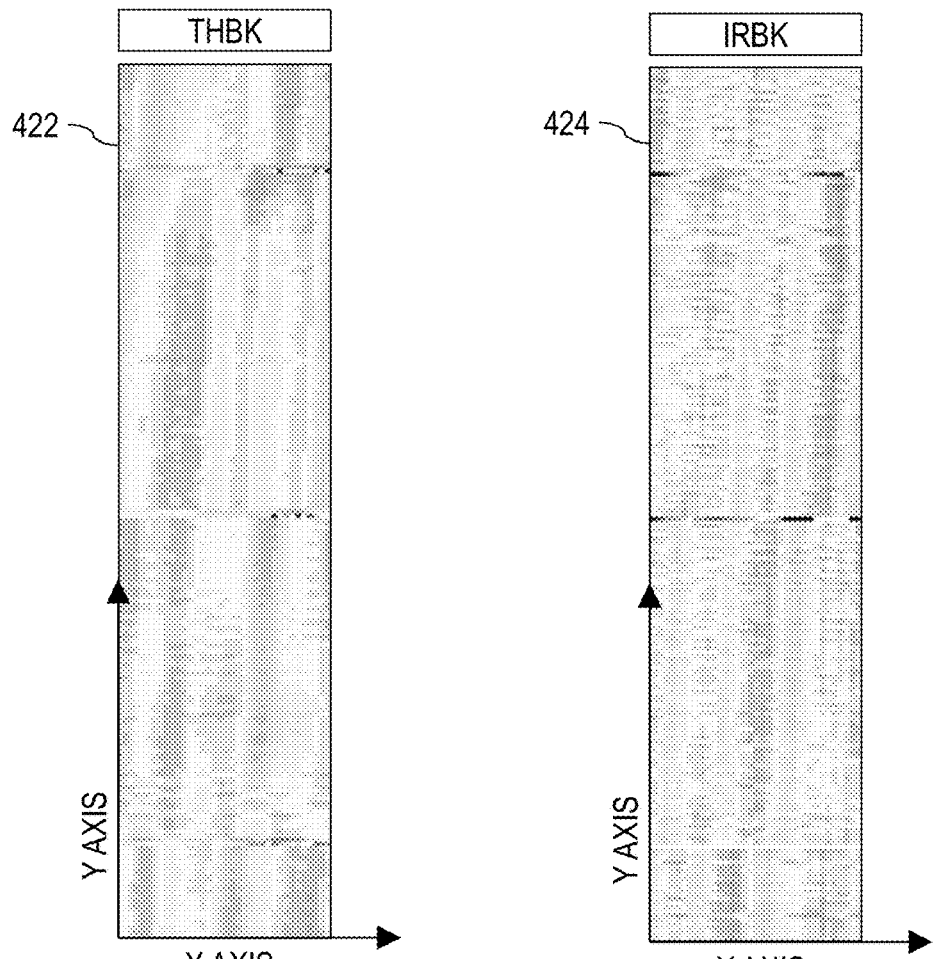
FIG. 6
FIG. 7

DETECTING DEFECTS IN TUBULAR STRUCTURES

BACKGROUND OF THE DISCLOSURE

Steel tubular structures (e.g., pipes) may be installed within wells to secure wells and/or to produce oil and gas from reservoirs located in subterranean geological formations in the Earth's crust. Such tubular structures can develop defects (e.g., metal loss caused by corrosion and wear) that can cause structural deficiencies in the tubular structures. The defects and the associated structural deficiencies can worsen over time, resulting in leaks and/or breaks in the tubular structures, and can cause serious impact on stability and durability of wells. Therefore, imaging (e.g., acoustic, electromagnetic, mechanical, etc.) tools may be conveyed downhole within such tubular structures to measure predetermined characteristics (e.g., inner radius, wall thickness, etc.) of the tubular structures. Measurement data may then be analyzed to detect defects in the tubular structures. Strength (e.g., burst pressure) and/or remaining operational life of the tubular structures can then be determined based on the defects detected in the tubular structures.

However, some predetermined characteristics of the tubular structures that are measured by the imaging tools are oftentimes irregular or otherwise variable due to manufacturing processes (e.g., molding, bending, pressing, welding, etc.) used to manufacture such tubular structures. Variations in the predetermined characteristics of the tubular structures can prevent accurate detection of defects based on the measurement data. For example, variations in the predetermined characteristic of the tubular structure may be inaccurately interpreted or otherwise determined to be or comprise defects in the tubular structure, which can result in inaccurate determinations of strength and/or remaining operational life of the tubular structures.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces a method that includes receiving an input image of a tubular structure installed in a wellbore extending into a subterranean formation. The input image includes input data indicative of a characteristic of the tubular structure. The method also includes determining a background image based on the input image. The background image includes background data indicative of the characteristic of the tubular structure associated with manufacturing of the tubular structure. The method also includes determining a defect image based on a difference between the input image and the background image. The defect image includes defect data indicative of the characteristic of the tubular structure associated with defects in the tubular structure.

The present disclosure also introduces an apparatus including a processing system that includes a processor and a memory storing a computer program code. When executed by the processor, the computer program code causes the processing system to receive an input image of a tubular structure installed in a wellbore extending into a subterranean formation. The input image includes input data indicative of a characteristic of the tubular structure. The computer program code also causes the processing system to determine a background image based on the input image. The background image includes background data indicative of the characteristic of the tubular structure associated with manufacturing of the tubular structure. The computer program code also causes the processing system to determine a defect image based on a difference between the input image and the background image. The defect image includes defect data indicative of the characteristic of the tubular structure associated with defects in the tubular structure.

These and additional aspects of the present disclosure are set forth in the description that follows, and/or may be learned by a person having ordinary skill in the art by reading the material herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 4 is a schematic view of at least a portion of an apparatus related to one or more aspects of the present disclosure.

FIG. 5 is an axial view of a portion of the apparatus shown in FIG. 4.

FIGS. 6-15 are example images generated by one or more of the apparatuses shown in FIGS. 1, 2, 4, and 5 during at least a portion of the method shown in FIG. 3.

DETAILED DESCRIPTION

Figure 1:
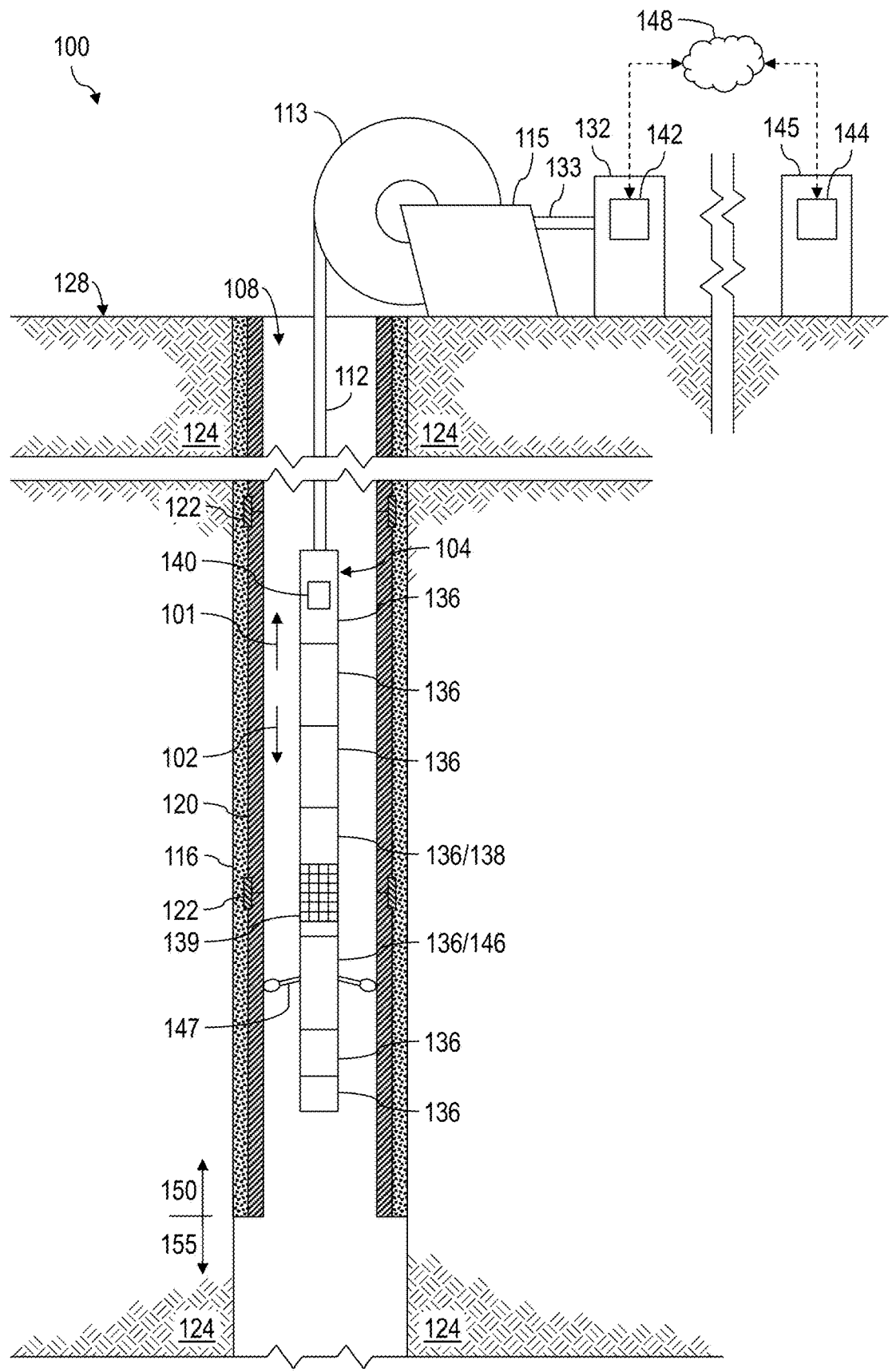
FIG. 1 is a schematic view of at least a portion of an example implementation of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity and does not in itself dictate a relationship between the various embodiments and/or configurations discussed. Moreover, the description of a first feature in contact with a second feature in the description that follows may include implementations in which the first and second features are in direct contact, and may also include implementations in which additional features may interpose the first and second features, such that the first and second features may not be in direct contact.

FIG. 1 is a schematic view of at least a portion of an example implementation of a wellsite system 100 to which one or more aspects of the present disclosure may be applicable. The wellsite system 100 may be onshore (as depicted) or offshore. In the example wellsite system 100, a tool string 104 is conveyed in a wellbore 108 via a wireline, slickline, and/or other conveyance means 112. The example wellsite system 100 may be utilized for evaluation of the wellbore 108, a casing 120 installed within the wellbore 108, cement 116 securing the casing 120 within the wellbore 108, a tubular (not shown) secured in the casing 120 (e.g., production services tubing), and/or a subterranean formation 124 penetrated by the wellbore 108 in cased 150 and/or open hole 155 sections. Individual casing joints forming the casing 120 may be coupled together end-to-end via corresponding connection collars 122. The major part of the wellbore is shown as a "cased wellbore," but may be open hole (without cement or casing secured to the formation).

The tool string 104 is suspended in the wellbore 108 from the lower end of the conveyance means 112. The conveyance means 112 may be a single- or multi-conductor slickline or wireline logging cable spooled on a drum 113 of a winch 115 at the surface 128 of the wellsite from whence the wellbore 108 extends. The wellsite surface 128 is the generally planar surface of the terrain (i.e., Earth's surface), a floor of a rig (not shown) at the wellsite, or other equipment at the wellsite, which is perpendicularly penetrated by the wellbore 108. Operation of the winch 115 rotates the drum 113 to reel in the conveyance means 112 to thereby pull the tool string 104 in an uphole direction 101 in the wellbore 108, as well as to reel out the conveyance means 112 to thereby move the tool string 104 in a downhole direction 102 in the wellbore 108. The conveyance means 112 may include one or more conductors (not shown) that facilitate data communication between the tool string 104 and surface equipment 132 disposed at the wellsite surface 128, including through one or more slip rings, cables, and/or other conductors (schematically depicted in FIG. 1 by reference number 133) electrically connecting the one or more conductors of the conveyance means 112 with the surface equipment 132. The conveyance means 112 may alternatively transport the tool string 104 without a conductor inside the cable, but with at least one module that can autonomously acquire and/or process and/or store downhole measurements in downhole memory without human intervention or communication with the surface equipment 132. Although not illustrated as such in FIG. 1, the winch 115 may be disposed on a service vehicle or a stationary skid/platform. The service vehicle or stationary skid/platform may also contain at least a portion of the surface equipment 132.

The tool string 104 comprises a plurality of modules 136, one or more of which may comprise an elongated housing and/or mandrel carrying various electronic and/or mechanical components. For example, at least one of the modules 136 may be or comprise a downhole imaging device for measuring one or more characteristics (or features) of a downhole object, such as the wellbore 108, the casing 120, other tubular structure (e.g., production tubing) installed in the casing 120 (not shown), the cement 116, and/or the formation 124. The imaging device may include an acoustic (e.g., ultrasonic) measuring device operable to transmit acoustic signals toward and/or through the downhole object and receive the acoustic signals returning from the downhole object to measure the characteristics of the downhole object. The imaging device may also or instead include an electromagnetic measuring device operable to transmit electromagnetic signals toward and/or through the downhole object and receive the electromagnetic signals returning from the downhole object to measure the characteristics of the downhole object. The imaging device may also or instead include a mechanical measuring device (e.g., calipers) operable to mechanically or otherwise physically contact the downhole object to measure the characteristics of the downhole object.

The imaging device (or a processing device communicatively connected to the imaging device) may then process raw measurement data (i.e., the received signals) to generate, construct, or otherwise output an image indicative of the one or more characteristics of the downhole object. The image may be a two-dimensional image using colors or different gray scales to indicate the characteristics of the downhole object at different azimuthal positions and at different depths. An image that correlates a feature and/or characteristic of a downhole object to a location of the downhole object may be referred to as a map or a mapped image. One or more of the modules 136 may also or instead be or comprise at least a portion of a device for obtaining sidewall or inline core and/or fluid (liquid and/or gas) samples from the wellbore 108 and/or formation 124. Other implementations of the downhole tool string 104 within the scope of the present disclosure may include additional or fewer components or modules 136 relative to the example implementation depicted in FIG. 1.

The wellsite system 100 also includes a data processing system that may include at least one surface controller (i.e., a processing device) 142 in one or more of the surface equipment 132, at least one downhole controller 140 in one or more of the modules 136 of the tool string 104, and/or at least one remote controller 144 located at a remote data center 145 or otherwise at a distance from the wellsite surface 128. Although one downhole controller 140 is shown, each module 136 may comprise a corresponding downhole controller 140. The downhole controller 140 and the surface controller 142 may be communicatively connected via a wired communication means (e.g., electrical cables, fiber optic cables, etc.) extending through the conveyance means 112 and/or via a wireless communication means (e.g., electromagnetic telemetry). The surface controller 142 and the remote controller 144 may be communicatively connected via a wide area communication network 148 (e.g., a cellular communication network, a satellite communication network, the internet, etc.). The data processing system may further comprise various electrical connectors and/or communication equipment (not shown) for communicatively connecting the controllers 140, 142, 144, sensors, and actuators of the wellsite system 100. The data processing system may include one or more computer systems or devices and/or may be a distributed computer system. For example, collected data or information may be stored by one or more of the controllers 140, 142, 144, distributed between two or more of the controllers 140, 142, 144, processed locally by the downhole controller 140 and/or the surface controller 142, processed remotely by the remote controller 144, and/or communicated to a human wellsite operator.

The data processing system may, whether individually or in combination with other system components, perform the methods and/or processes described below, or portions thereof. For example, the data processing system may include processor capability for collecting caliper, acoustic, ultrasonic, electromagnetic, and/or other measurement data related to the evaluation of the cement 116, the casing 120, a tubular structure (not shown) installed in the casing 120, and/or the formation 124, according to one or more aspects of the present disclosure. Methods and/or processes within the scope of the present disclosure may be implemented by one or more computer programs that that are executed by a processor of one or more of the controllers 140, 142, 144.

Such programs may utilize sensor and/or control data received by the downhole controller 140 and/or other modules 136 and may transmit control signals to operative elements of the tool string 104. Such communication may be via one or more electrical or optical conductors of the conveyance means 112. The programs may be stored on a tangible, non-transitory, computer-usable storage medium associated with the one or more processors of the downhole controller 140, the surface controller 142, and/or the remote controller 144, or may be stored on an external, tangible, non-transitory, computer-usable storage medium that is electronically coupled to such processor(s). The storage medium may be one or more known or future-developed storage media, such as a magnetic disk, an optically readable disk, flash memory, or a computer-readable device of another kind, including a remote storage device coupled over one or more wired and/or wireless communication links, among other examples.

As designated in FIG. 1 by reference number 138, at least one of the modules 136 may be or comprise an acoustic (e.g., ultrasonic) imaging device (e.g., a phased array tool) operable for acquiring acoustic measurements characterizing the wellbore 108, the casing 120, other tubular structures installed in the casing 120, the cement 116, and/or the formation 124. The acoustic measuring device 138 comprises a phased array 139 of acoustic transducers that may each be operated as an acoustic transmitter and/or receiver. The one or more modules 136 may also include an orientation module permitting measurement of the azimuth of the tool 138. Such module may include, for example, one or more of relative bearing (RB) or gravity/acceleration, magnetometer and gyroscope sensors.

As designated in FIG. 1 by reference number 146, another one (or more) of the modules 136 may be or comprise a centralizer module. For example, the centralizer module 146 may comprise an electric motor driven by the downhole controller 140 (or another downhole controller 140 associated with the centralizer module 146) and/or other means for actively extending and retracting a plurality of centralizing arms 147. Although only two centralizing arms 147 are depicted in the example implementation shown in FIG. 1, other implementations within the scope of the present disclosure may have more than two centralizing arms 147. Extension of the centralizing arms 147 aids in urging the acoustic measuring device 138 (and/or other measuring devices, such as an electromagnetic measuring device and/or a mechanical measuring device) to a central position within the casing 120, other tubular structures, or the wellbore 108 being investigated by the acoustic measuring device 138 (and/or the other measuring devices). Implementations of the tool string 104 within the scope of the present disclosure may include more than one instance of the acoustic measuring device 138 and/or more than one instance of the centralizer module 146. The modules 136 may be conveyed in either or both of open hole 150 and cased hole 155 sections, including implementations in which the centralizer module 146 and the acoustic measuring device 138 may be configured or configurable for use in either or both of the two sections. The tool string 104 may also be deprived of centralizer module 146.

Figure 2:
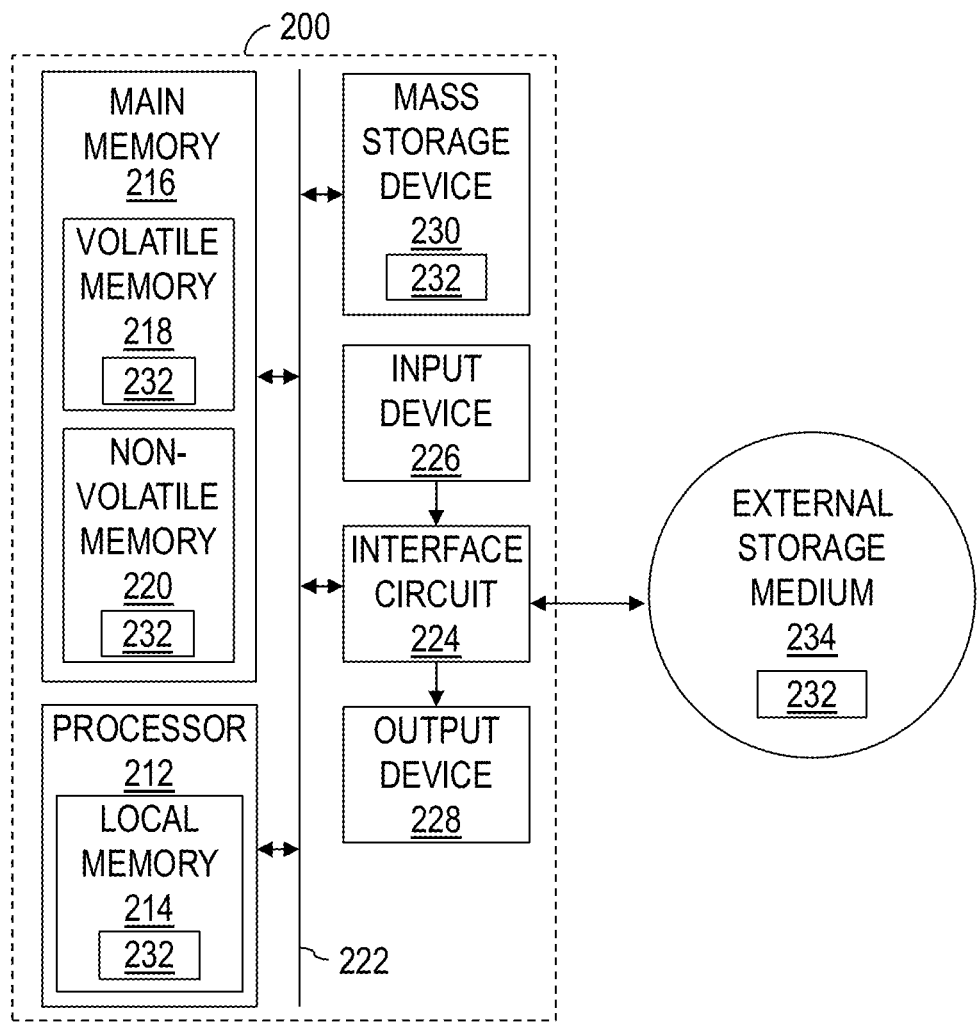
FIG. 2 is a schematic view of at least a portion of an example implementation of apparatus according to one or more aspects of the present disclosure.

FIG. 2 is a schematic view of at least a portion of an example implementation of a processing device (or system) 200 according to one or more aspects of the present disclosure. The processing device 200 may be or form at least a portion of one or more controllers and/or other equipment shown in FIG. 1. Accordingly, the following description refers to FIGS. 1 and 2, collectively.

The processing device 200 may be or comprise, for example, one or more processors, controllers, special-purpose computing devices, personal computers (PCs, e.g., desktop, laptop, and/or tablet computers), personal digital assistants, smartphones, industrial PCs (IPCs), programmable logic controllers (PLCs), servers, internet appliances, and/or other types of computing devices. The processing device 200 may be implemented as part of one or more portions of the wellsite system 100. For example, the processing device 200 may be or form at least a portion of the tool string 104, the surface equipment 132, and the data center 145, including the downhole controller 140, the surface controller 142, and the remote controller 144. Although it is possible that the entirety of the processing device 200 is implemented within one device, it is also contemplated that one or more components or functions of the processing device 200 may be implemented across multiple devices.

The processing device 200 may comprise a processor 212, such as a general-purpose programmable processor. The processor 212 may comprise a local memory 214 and may execute machine-readable and executable program code instructions 232 (i.e., computer program code) present in the local memory 214 and/or other memory device. The processor 212 may be, comprise, or be implemented by one or more processors of various types suitable to the local application environment, and may include one or more general-purpose computers, special-purpose computers, microprocessors, digital signal processors (DSPs), field-programmable gate arrays (FPGAs), application-specific integrated circuits (ASICs), graphics processing units (GPUs), and/or processors based on a multi-core processor architecture, as non-limiting examples. Examples of the processor 212 include one or more INTEL microprocessors, microcontrollers from the ARM and/or PICO families of microcontrollers, and embedded soft/hard processors in one or more FPGAs.

The processor 212 may execute, among other things, the program code instructions 232 and/or other computer instructions and/or programs to implement the example methods and/or operations described herein. For example, the program code instructions 232, when executed by the processor 212 of the processing device 200, may cause the processor 212 to receive and process (e.g., transform, compare, etc.) sensor data (i.e., measurement data) based on the program code instructions 232 and then output the processed sensor data. The program code instructions 232, when executed by the processor 212 of the processing device 200, may also or instead output control data (i.e., control commands) to cause one or more pieces of equipment or equipment subsystems of an offshore system to perform the example methods and/or operations described herein.

The processor 212 may be in communication with a main memory 216, such as may include a volatile memory 218 and a non-volatile memory 220, perhaps via a bus 222 and/or other communication means. The volatile memory 218 may be, comprise, or be implemented by random-access memory (RAM), static RAM (SRAM), dynamic RAM (DRAM), synchronous DRAM (SDRAM), RAMBUS DRAM (RDRAM), and/or other types of RAM devices. The non-volatile memory 220 may be, comprise, or be implemented by read-only memory, flash memory, and/or other types of memory devices. One or more memory controllers (not shown) may control access to the volatile memory 218 and/or the non-volatile memory 220.

The processing device 200 may also comprise an interface circuit 224, which is in communication with the processor 212, such as via the bus 222. The interface circuit 224 may be, comprise, or be implemented by various types of standard interfaces, such as an Ethernet interface, a universal serial bus (USB), a third generation input/output (3GIO) interface, a wireless interface, a cellular interface, and/or a satellite interface, among others. The interface circuit 224 may comprise a graphics driver card. The interface circuit 224 may comprise a communication device, such as a modem or network interface card to facilitate exchange of data with external computing devices via a network (e.g., Ethernet connection, DSL, telephone line, coaxial cable, cellular telephone system, satellite, etc.).

The processing device 200 may be in communication with various sensors, video cameras, actuators, processing devices, controllers, and other devices via the interface circuit 224. The interface circuit 224 can facilitate communications between the processing device 200 and one or more devices by utilizing one or more communication protocols, such as an Ethernet-based network protocol (such as ProfiNET, OPC, OPC/UA, Modbus TCP/IP, EtherCAT, UDP multicast, Siemens S7 communication, or the like), a proprietary communication protocol, and/or other communication protocol.

One or more input devices 226 may also be connected to the interface circuit 224. The input devices 226 may permit rig personnel to enter the program code instructions 232, which may be or comprise control data, operational parameters, and/or operational set-points. The program code instructions 232 may further comprise modeling or predictive routines, equations, algorithms, processes, applications, and/or other programs operable to perform example methods and/or operations described herein. The input devices 226 may be, comprise, or be implemented by a keyboard, a mouse, a joystick, a touchscreen, a track-pad, a trackball, an isopoint, and/or a voice recognition system, among other examples. One or more output devices 228 may also be connected to the interface circuit 224. The output devices 228 may permit visualization or other sensory perception of various data, such as sensor data, status data, and/or other example data. The output devices 228 may be, comprise, or be implemented by video output devices (e.g., a liquid crystal display (LCD), a light-emitting diode (LED) display, a cathode ray tube (CRT) display, a touchscreen, etc.), printers, and/or speakers, among other examples. The one or more input devices 226 and the one or more output devices 228 connected to the interface circuit 224 may, at least in part, facilitate human machine interfaces (HMIs).

The processing device 200 may comprise a mass storage device 230 for storing data and program code instructions 232. The mass storage device 230 may be connected to the processor 212, such as via the bus 222. The mass storage device 230 may be or comprise a tangible, non-transitory storage medium, such as a hard disk drive, a compact disk (CD) drive, and/or digital versatile disk (DVD) drive, among other examples. The processing device 200 may be communicatively connected with an external storage medium 234 via the interface circuit 224. The external storage medium 234 may be or comprise a removable storage medium (e.g., a CD or DVD), such as may be operable to store data and program code instructions 232.

As described above, the program code instructions 232 may be stored in the mass storage device 230, the main memory 216, the local memory 214, and/or the removable storage medium 234. Thus, the processing device 200 may be implemented in accordance with hardware (perhaps implemented in one or more chips including an integrated circuit, such as an ASIC), or may be implemented as software or firmware for execution by the processor 212. In the case of firmware or software, the implementation may be provided as a computer program product including a non-transitory, computer-readable medium or storage structure embodying computer program code instructions 232 (i.e., software or firmware) thereon for execution by the processor 212. The program code instructions 232 may include program instructions or computer program code that, when executed by the processor 212, may perform and/or cause performance of example methods, processes, and/or operations described herein.

The present disclosure is further directed to example methods (e.g., operations and/or processes) that can be performed by one or more portions of the wellsite system 100. The methods may be performed by utilizing (or otherwise in conjunction with) at least a portion of one or more implementations of one or more instances of the apparatus shown in one or more of FIGS. 1 and 2, and/or otherwise within the scope of the present disclosure. The methods may be caused to be performed, at least partially, by a controller (e.g., one or more of the controllers 140, 142, 144) executing computer program code according to one or more aspects of the present disclosure. Thus, the present disclosure is also directed to a non-transitory, computer-readable medium comprising computer program code that, when executed by the controller, may cause such controller to perform the example methods described herein. The methods may also or instead be caused to be performed, at least partially, by a human wellsite operator (e.g., rig personnel) utilizing one or more instances of the apparatus shown in one or more of FIGS. 1 and 2, and/or otherwise within the scope of the present disclosure. Thus, the following description of example methods refer to apparatus shown in one or more of FIGS. 1 and 2. However, the methods may also be performed in conjunction with implementations of apparatus other than those depicted in FIGS. 1 and 2 that are also within the scope of the present disclosure.

Figure 3:
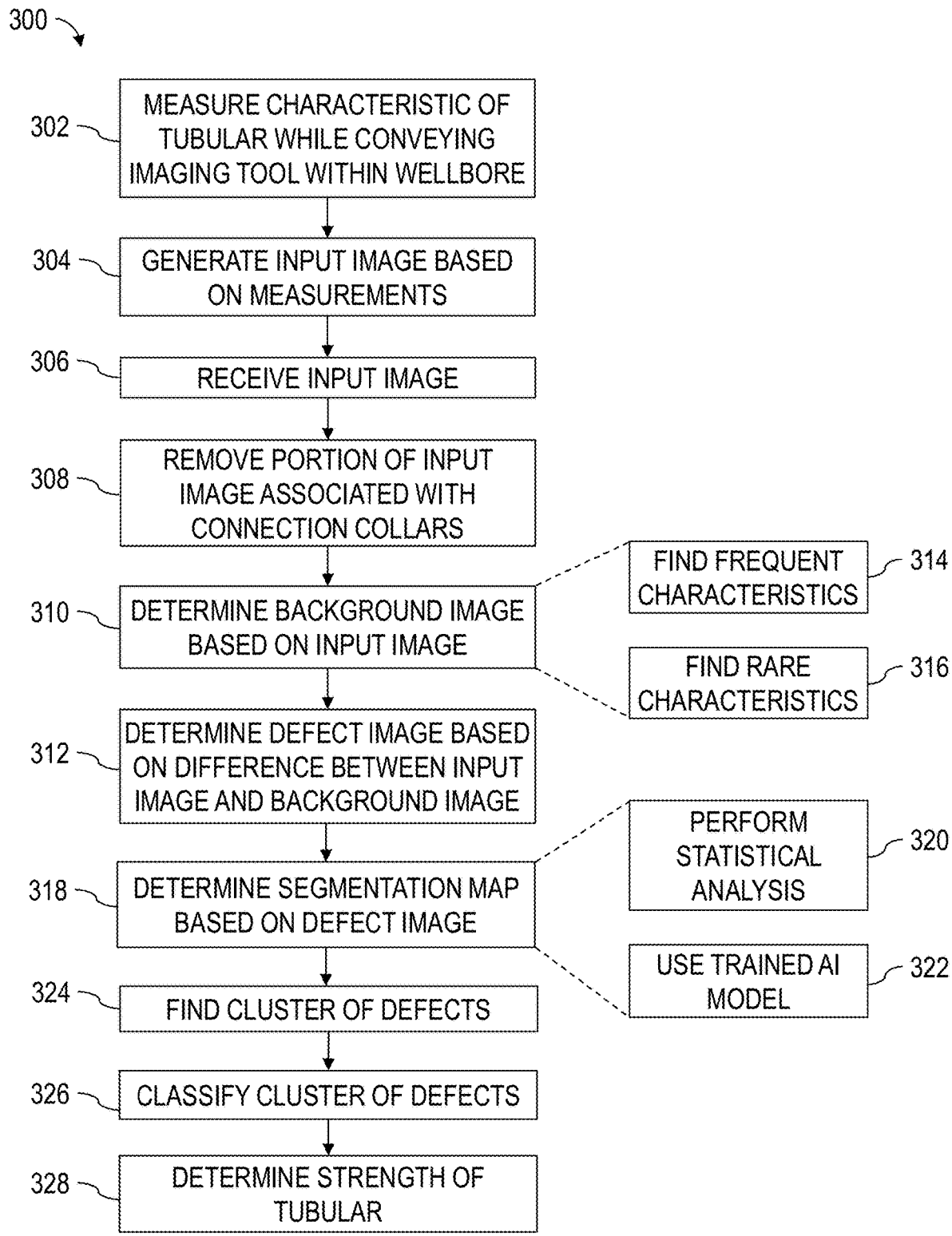
FIG. 3 is a flow-chart diagram of at least a portion of a method according to one or more aspects of the present disclosure.

FIG. 3 is a flow-chart diagram of at least a portion of an example implementation of a method (300) for measuring characteristics of a downhole tubular structure to detect defects in the tubular structure based on the measured characteristics and then to determine strength and/or remaining operational life of the downhole tubular structure based on the detected defects. For example, the method (300) may comprise measuring (302) one or more predetermined characteristics (or features) of a downhole tubular structure (e.g., the casing 120, a production tubing, etc.) via an imaging tool 136 while conveying the imaging tool 136 within a wellbore 108. Such measuring (302) operations may comprise operating the controller 142 to cause a winch 115 to wind or unwind a conveyance means 112 to convey a tool string 104 comprising the imaging tool 136 in uphole (101) and/or downhole (102) directions along the wellbore 108. The measuring (302) operations may further comprise operating one or more of the controllers 140, 142 to cause the imaging tool 136 to measure the characteristics of the downhole tubular structure by causing the imaging tool to transmit sensor signals (e.g., acoustic, electromagnetic, etc.) toward and/or through the tubular structure and receive the sensor signals returning from the tubular structure. The downhole controller 140 of the imaging tool 136 may then store the received sensor signals as raw measurement data (or sensor data) or transmit the raw measurement data to the surface controller 142 and/or the remote controller 144. The raw measurement data may be indicative of the predetermined characteristics of the tubular structure. The imaging tool 136 may be or comprise an acoustic (e.g., ultrasonic) imaging tool operable to transmit and receive acoustic sensor signals, an electromagnetic imaging tool operable to transmit and receive electromagnetic sensor signals, or a mechanical caliper imaging tool operable to mechanically (physically) contact the tubular structure with a mechanical sensor to generate measurement data indicative of the predetermined characteristics of the tubular structure.

FIG. 4 is a schematic view of an imaging tool 400 (e.g., imaging tool 136, 138) operable to measure one or more predetermined characteristics of a downhole tubular structure 402, such as casing or production tubing, disposed within a wellbore (not shown). The imaging tool 400 may measure (e.g., scan) a predetermined characteristic of the tubular structure 402 azimuthally 408 at each intended axial 404, 406 plane 410 along a predetermined height (or length) of the wellbore while the imaging tool 400 is conveyed axially 404, 406 within the tubular structure 402. Raw measurement data generated by the imaging tool 400 may include azimuthal measurements 412 of the predetermined characteristic of the tubular structure 402 for each axial 404, 406 plane 410.

FIG. 5 is a schematic axial view of the azimuthal measurements 412 of the predetermined characteristic the tubular structure 402 shown in FIG. 4. The azimuthal measurements 412 have been captured or otherwise generated by the imaging tool 400 at a single axial 404, 406 plane 410. The azimuthal measurements 412 may comprise raw measurement data indicative of variations (or changes) in the wall thickness 416 of the tubular structure 402 measured azimuthally 408 along the tubular structure 402. The azimuthal measurements 412 may instead comprise data indicative of variations (or changes) in the radius 418 of an inner surface of the tubular structure 402 measured azimuthally 408 along the tubular structure 402. Azimuthal measurements 412 may be generated for each axial 404, 406 plane 410 over a predetermined height of the tubular structure 402. Thus, the predetermined characteristic of the tubular structure 402 may be or comprise azimuthal and axial variations in the radius 418 of the inner surface of the tubular structure 402. The predetermined characteristic of the tubular structure may also or instead be or comprise azimuthal and axial variations in the wall thickness 416 of the tubular structure 402. The raw measurement data, including the azimuthal measurements 412, may also be indicative of various defects 414 (e.g., metal loss caused by wear, decay, corrosion, etc.) in the tubular structure 402.

One or more of the controllers 140, 142, 144 may process the raw measurement data, including the azimuthal measurements 412, to generate (304) an image comprising data indicative of the predetermined characteristic of the tubular structure 402. For example, one or more of the controllers 140, 142, 144 may convert the azimuthal measurements 412 into a two-dimensional or a three-dimensional image comprising data indicative of the predetermined characteristic of the tubular structure 402, such as by linearizing each instance of the azimuthal measurements 412 with respect to a predetermined azimuthal position 420 and combining (or integrating) the linearized azimuthal measurements 412 over the predetermined height of the tubular structure 402.

FIGS. 6 and 7 are example images 422, 424 generated by one or more of the controllers 140, 142, 144 based on the azimuthal measurements 412 generated by the imaging tool 400. Variations in the predetermined characteristic of the tubular structure 402 may be indicated by different colors (not shown) or different gray scales. Each image 422, 424 may also map or otherwise associate a measurement of the predetermined characteristic of the tubular structure 402 with corresponding azimuthal and axial positions of the tubular structure 402. For example, different azimuthal positions of the tubular structure 402 may be associated with different linear positions along the x-axis of each image 422, 424 and different axial positions of the tubular structure 402 may be associated with different linear positions along the y-axis of each image 422, 424. The image 422 comprises data indicative of variations in wall thickness 416 of the tubular structure 402, which may be referred to in the industry as a THBK image. The image 424 comprises data indicative of variations in inner radius 418 of the tubular structure 402, which may be referred to in the industry as an IRBK image.

Images within the scope of the present disclosure generated by one or more of the controllers 140, 142, 144 may comprise data indicative of a predetermined characteristic of the tubular structure 402 that has been formed during, has been caused by, or is otherwise associated with various historical events of the tubular structure 402. For example, the images 422, 424 may comprise data indicative of variations in wall thickness 416 or variations in inner radius 418 of the tubular structure 402 that have been formed during, have been caused by, or are otherwise associated with the manufacturing process of the individual tubulars (e.g., pipe joints, casing joints, etc.) forming the tubular structure 402. The images 422, 424 may also comprise data indicative of variations in wall thickness 416 or variations in inner radius 418 of the tubular structure 402 that have been caused by or are otherwise associated with connection collars (e.g., connection collars 122) for coupling together adjacent tubular joints forming the tubular structure 402.

Figure 8:
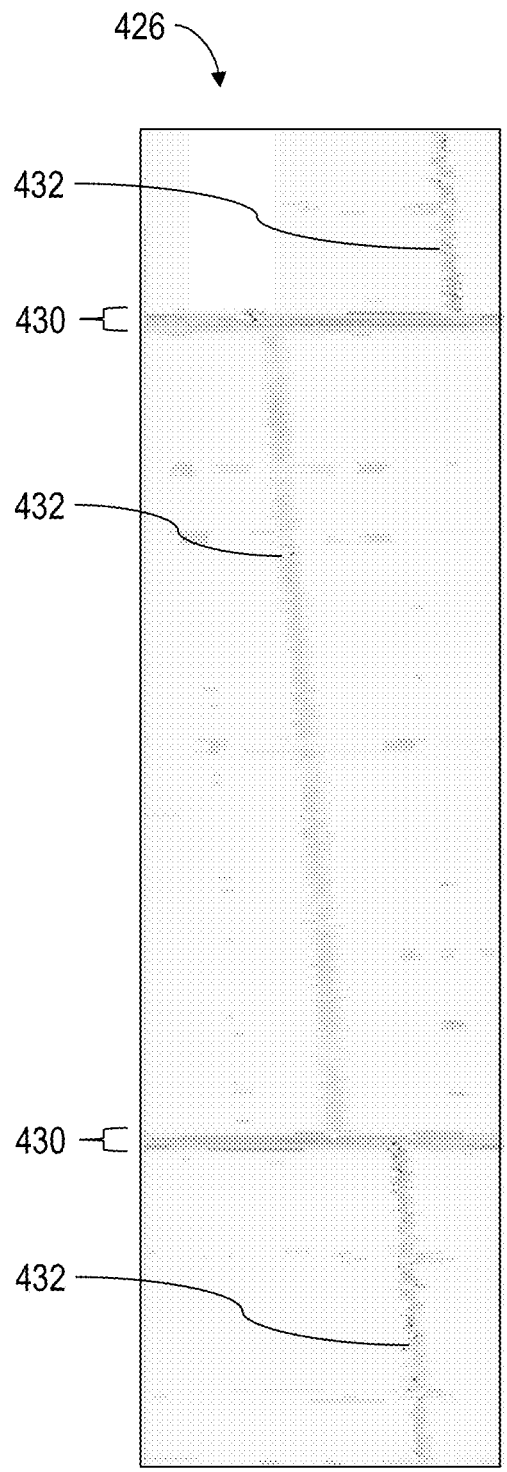

FIG. 8 is an example THBK image 426 comprising data indicative of variations in wall thickness 416 of an example tubular structure 402 that have been caused by or are otherwise associated with the manufacturing process of the tubular structure 402. The variations in wall thickness 416 of the tubular structure 402 may be indicated by different colors (not shown) or different gray scales. The image 426 comprises a plurality of relatively thin, elongated, and horizontally extending regions 430 indicating inconsistent (e.g., incomprehensible, erratic, erroneous, extreme, etc.) data along the axial direction 404, 406 at narrowly defined axial locations of the tubular structure 402 and extending azimuthally through the entire tubular structure 402. The horizontal regions 430 indicate axial locations at which connection collars of the tubular structure 402 are located. The image 426 also comprises a singular, relatively thin, elongated, and substantially axially extending region 432 extending between the horizontal regions 430. The region 432 indicates a change in thickness 416 along the azimuthal direction 408 at a narrowly defined azimuthal location of the tubular structure 402. The region 432 is continuous between adjacent horizontal regions 430, but not continuous across the horizontal regions 430. The vertical regions 432 indicate azimuthal location 408 where each individual tubular joint forming the tubular structure 402 is welded. The vertical regions 432 therefore indicate that the tubular structure 402 comprises welded tubular joints, each comprising an axial weld formed during the manufacturing (e.g., rolling and welding) process of each individual tubular joint to join together opposing ends of a rolled sheet of metal.

Figure 9:
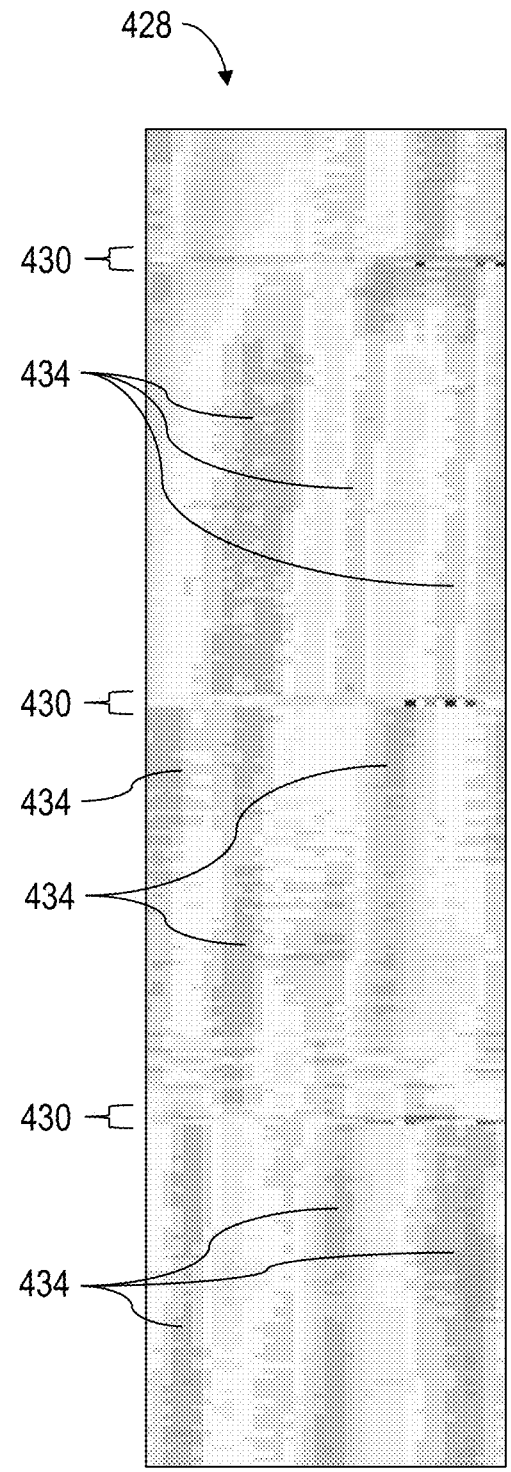

FIG. 9 is another example THBK image 428 comprising data indicative of variations in wall thickness 416 of an example tubular structure 402 that have been caused by or are otherwise associated with the manufacturing process of the tubular structure 402. The variations in thickness of the tubular structure 402 may be indicated by different colors (not shown) or different gray scales. The image 428 comprises a plurality of relatively thin, elongated, and horizontally extending regions 430 indicating inconsistent (e.g., incomprehensible, erratic, erroneous, extreme, etc.) data along the axial direction 404, 406 at narrowly defined axial locations of the tubular structure 402 and extending azimuthally through the entire tubular structure 402. The horizontal regions 430 indicate axial locations at which connection collars of the tubular structure 402 are located. The image 428 also comprises a plurality of neighboring and differently shaped regions 434 extending between the horizontal regions 430. The regions 434 are not continuous across the horizontal regions 430 associated with the connection collars. The regions 434 are indicative of progressive and repetitive variations in thickness 416, primarily along the azimuthal direction 408 of the tubular structure 402. The regions 434 indicate that the tubular structure 402 comprises molded tubular joints, each comprising repetitive variations in thickness 416 formed during the manufacturing (i.e., molding) process of each individual tubular joint. The data indicative of repetitive variations in thickness 416 or inner radius 418 of the tubular structure 402 that have been formed during, have been caused by, or are otherwise associated with the manufacturing process of the individual tubulars (e.g., pipe joints, casing joints, etc.) forming the tubular structure 402 may be referred to as manufacturing patterns.

Images within the scope of the present disclosure may also comprise data indicative of variations in wall thickness 416 or variations in inner radius 418 of the tubular structure 402 that have been caused by or are otherwise associated with defects in the tubular structure 402. Defects within the scope of the present disclosure are those that have been caused during downhole operations or otherwise after the tubular structure 402 has been manufactured and/or installed within a wellbore. Such defects may be or comprise loss or deformation of metal in the tubular structure 402 caused by wear, decay, erosion, corrosion, and/or other means that cause loss or deformation of metal.

Figure 10:
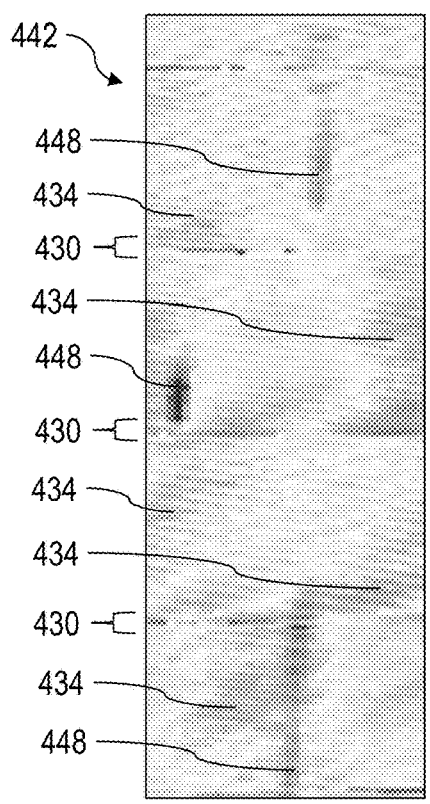

FIG. 10 is an example THBK image 442 comprising data indicative of variations in wall thickness 416 of the tubular structure 402 associated with localized defects in the tubular structure 402. The variations in thickness 416 of the tubular structure 402 may be indicated by different colors (not shown) or different gray scales. The localized defects may be indicated by one or more relatively localized (e.g., narrowly defined in both axial and azimuthal directions) and randomly-placed regions 448 indicating a variation in thickness 416. The localized regions 448 may be indicative of localized defects, such as localized axial slotting or grooving, localized circumferential slotting or grooving, and localized corrosion, each caused by one or more of localized wear, decay, erosion, and corrosion. The image 442 may also comprise the regions 430 associated with the connection collars and the regions 434 associated with the manufacturing patterns.

Figure 11:
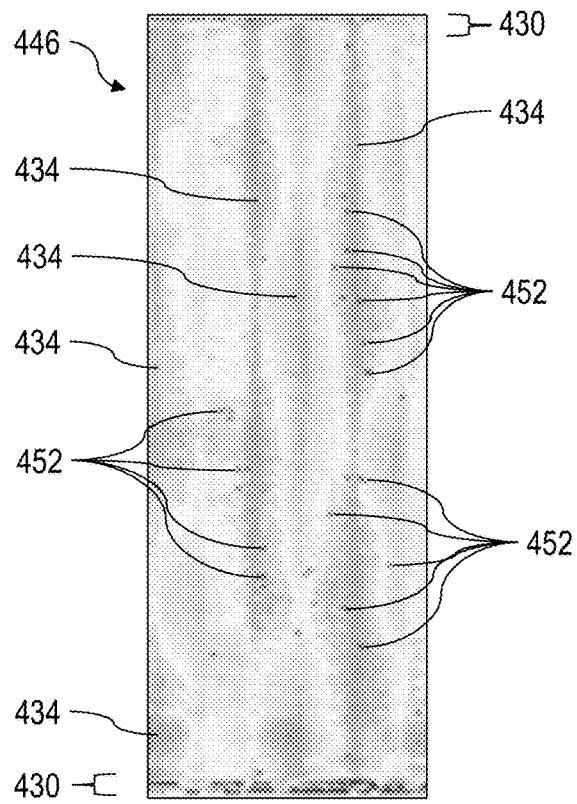

FIG. 11 is an example THBK image 446 comprising data indicative of variations in wall thickness 416 of the tubular structure 402 associated with other localized defects in the tubular structure 402. The variations in thickness of the tubular structure 402 may be indicated by different colors (not shown) or different gray scales. Such localized defects may be indicated by a plurality of relatively localized, randomly-placed dots (or spots) 452, each indicating a variation in thickness 416. The dots 452 may be indicative of localized defects, such as pin holes and pitting, each caused by one or more of localized decay and corrosion. Although the area of each individual defect is small, a tubular structure 402 may contain a large number of such individual defects covering a wide-ranging (i.e., spread out) area. The image 442 may also comprise the regions 430 associated with the connection collars and the regions 434 associated with the manufacturing patterns.

Figure 12:
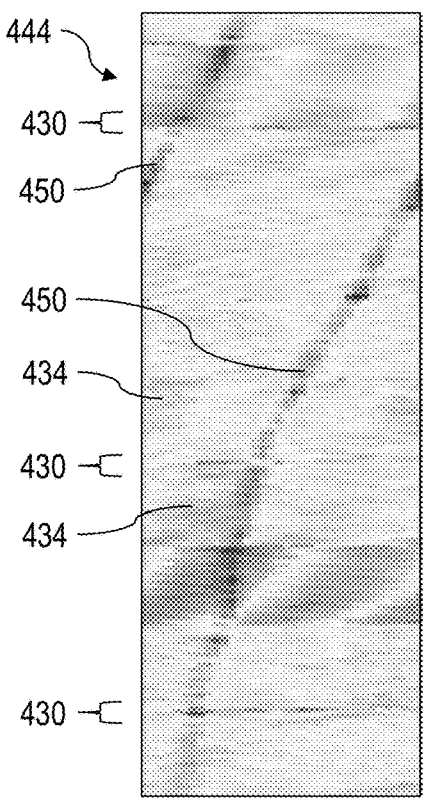

FIG. 12 is an example THBK image 444 comprising data indicative of variations in wall thickness 416 of the tubular structure 402 associated with non-localized (e.g., long, wide-ranging, etc.) defects in the tubular structure 402. The variations in thickness of the tubular structure 402 may be indicated by different colors (not shown) or different gray scales. Non-localized defects may be indicated by non-localized regions extending widely in axial and/or azimuthal directions, such as axially across a plurality of tubular joints forming the tubular structure 402 and/or azimuthally along a substantial portion (e.g., more than half) of the circumference of the tubular structure 402. For example, non-localized defects may comprise non-localized axial slotting or grooving, non-localized circumferential slotting or grooving, and non-localized corrosion, each caused by one or more of non-localized wear, decay, erosion, and corrosion.

The image 444 comprises a non-localized region 450 comprising a relatively thin, elongated, and substantially axially-extending geometry. The region 450 is indicative of a change in thickness along the azimuthal direction 408 at a narrowly defined azimuthal location of the tubular structure 402. The region 450 may be indicative of a non-localized defect on a side (e.g., sidewall) side of the tubular structure 402 and extending axially along the tubular structure 402. The region 450 is continuous across the horizontal regions 430 associated with the connection collars. The defects associated with the region 450 may be caused by wear (i.e., friction) on one side of the tubular structure 402 by downhole tools and/or a conveyance means (e.g., wireline, coiled tubing, etc.) during downhole conveyance operations. The image 444 may also comprise the regions 430 associated with the connection collars and regions 434 associated with the manufacturing patterns.

After an image within the scope of the present disclosure is generated (304) by one or more of the controllers 140, 142, 144, the image may be processed by one or more of the controllers 140, 142, 144 to facilitate the determination of strength and/or remaining operational life of the tubular structure 402. Therefore, after an image is generated (304), the image may be received (306) by the one or more of the controllers 140, 142, 144 selected to perform such further processing. For example, if the image has been generated by the downhole controller 140, the image may then be transmitted to one or more of the controllers 142, 144 for further processing. However, an image may instead be generated and then further processed by the downhole controller 140. Because the image generated by one or more of the controllers 140, 142, 144 is used as input that is processed by one or more of the controllers 140, 142, 144 to facilitate the determination of the strength and/or remaining operational life of the tubular structure 402, an image within the scope of the present disclosure, generated by one or more of the controllers 140, 142, 144 based on measurement data, may be referred to hereinafter as an input image and the data indicative of a predetermined characteristic of the tubular structure 402 contained by the image may be referred to hereinafter as input data.

Figure 13:
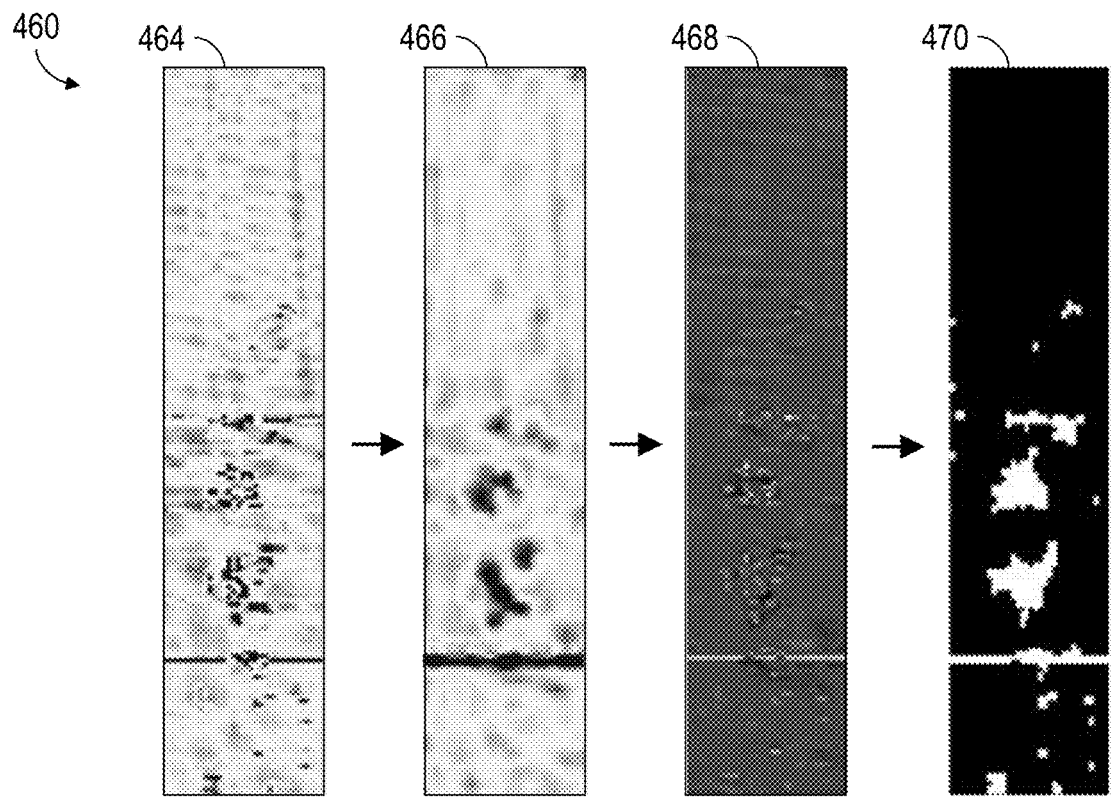
Figure 14:
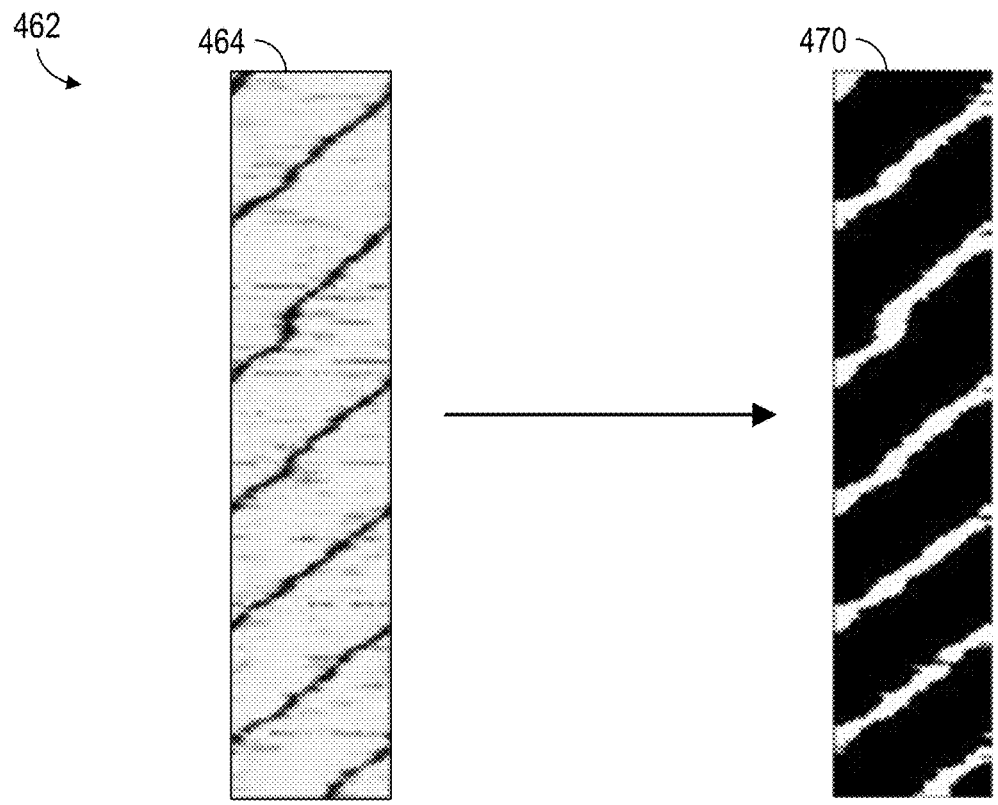

FIGS. 13 and 14 are example workflows 460, 462, respectively, each showing various images 464, 466, 468, 470 that are received, processed, and determined (or generated) by one or more of the controllers 140, 142, 144 while the method (300) shown in FIG. 3 is performed. Each workflow 460 shows an example input image 464 received (306) by the one or more of the controllers 140, 142, 144 selected to further process the input image 464. The input image 464 of the workflow 460 comprises input data indicative of variations in wall thickness 416 of the tubular structure 402 associated with localized defects in the tubular structure 402, and the input image 464 of the workflow 462 comprises input data indicative of variations in wall thickness 416 of the tubular structure 402 associated with non-localized defects in the tubular structure 402.

After the input image 464 is received by one or more of the controllers 140, 142, 144, the method (300) may further comprise processing the input data of the input image 464 via one or more of the controllers 140, 142, 144 to determine (310) a background image 466 based on the input image 464. For example, the input data of the input image 464 may be processed to find (or recognize) and/or extract "macro" data that is indicative of a characteristic of the tubular structure 402 associated with large portions of or the entire tubular structure 402. The input data of the input image 464 may also or instead be processed to remove (or disregard) "micro" data that is indicative of a characteristic of the tubular structure 402 associated with small portions of the tubular structure 402.

The macro data may comprise, for example, input data indicative of variations in wall thickness 416 or inner radius 418 of the tubular structure 402 caused by or otherwise associated with the process of manufacturing (e.g., machining, molding, bending, welding, etc.) of the tubular structure 402. Example macro data indicative of variations in wall thickness 416 of the tubular structure 402 associated with the process of manufacturing of the tubular structure 402 may comprise portions of the input data associated with the regions 432, 434. The micro data may comprise, for example, input data indicative of variations in wall thickness 416 of the tubular structure 402 caused by or otherwise associated with localized defects and the connection collars coupling together adjacent tubular joints of the tubular structure 402. Such micro data comprises extreme values and are not regular throughout the tubular structure 402. Example micro data indicative of variations in wall thickness 416 of the tubular structure 402 may comprise portions of the input data associated with the regions 430 indicative of connection collars and regions 448, 452 indicative of localized defects. The micro data may further comprise, for example, input data indicative of variations in wall thickness 416 of the tubular structure 402 caused by or otherwise associated with certain non-localized defects. Examples of such micro data may comprise portions of the input data associated with the regions 450 indicative of narrowly defined (e.g., small, thin, narrow, etc.) wear on one side of the tubular structure 402. Such micro data comprises portions of the input data having extreme values that are not regular throughout the tubular structure 402, but are limited to a narrowly defined azimuthal location (e.g., having a relatively thin and axially-extending geometry) of the tubular structure 402. The micro data may also comprise noise (e.g., galaxy patterns, error processing, etc.), which can be interpreted as features of the tubular structure, but have no physical significance, just noise points. Because the macro data is associated with large portions of or the entire tubular structure 402, the macro data may be referred to as background data.

One or more of the controllers 140, 142, 144 may comprise an autoencoder that can be used to generate the background image 466 from the input image 464. An autoencoder may be or comprise a neural network that can reduce the input image 464 to a set of features that are statistically representative of the input image 464 and then reconstruct the input image 464 as the background image 466 based on the set of features. An autoencoder therefore focuses on statistically significant events in the input image 464 and removes from the input image 464 events that are statistically rare. Thus, one or more of the controllers 140, 142, 144 may be operable to find (314) in the input image 464 the input data indicative of the characteristic of the tubular structure 402 that is statistically representative of the input image 464, and then remove (316) from the input image 464 the input data indicative of the characteristic of the tubular structure that is statistically rare in the input image 464. The background image 466 (i.e., the reconstructed input image) generated by one or more of the controllers 140, 142, 144 may therefore include the macro features (i.e., features of the input image that are present in large portions of the input image or the whole input image), but not the micro features (i.e., localized and/or narrowly defined defects of the tubular structure 402 that are not statistically significant).

The method (300) may further comprise, prior to determining (310) the background image 466, pre-processing the input image to remove (or disregard) (308) portions of the input data of the input image 464 associated with the noise and/or the connection collars. For example, after one or more of the controllers 140, 142, 144 receives or stores an input image 464, the one or more of the controllers 140, 142, 144 may remove (308) data indicative of the characteristic of the tubular structure associated with the connection collars of the tubular structure and/or remove (308) data associated with noise in the input image 464.

Connection collars may be visible on different acquired channels of the imaging tool 400 and are not considered as variations in wall thickness 426. Various methods (including artificial intelligence ("AI") (including machine learning ("ML"))) may be implemented as part of the method step (308) to differentiate connection collars from intermediate portions of the tubular structure 402 in the input image 464 and then to remove from the input image 464 portions of the input image 464 associated with the connection collars. Removing (308) portions of the input image 464 associated with the connection collars may comprise extracting input data associated with horizontal features from the input image 464, performing statistical analysis on the sizes of the individual tubular joints forming the tubular structure 402, and detecting a width of the connection collars. Connection collars can be recognized on the input image 464 as partial horizontal lines. Therefore, convolutions between horizontal kernels and input data can be computed to highlight horizontal features. The resulting input image 464 may then be filtered to delete the horizontal features caused by sudden turns of the imaging tool 400 or data artifacts. A signal-to-noise ratio (thresholding) on a sliding window can be computed and used as a filtering indicator (thresholding). Thereafter, prominent peaks indicating locations of the connection collars can be computed, whereby depth of the prominent peaks may be indicative of connection collars. Further processing may be performed given a priori information on the size of the individual joints of the tubular structure 402. For example, to estimate a size of a tubular joint, one or more of the controllers 140, 142, 144 may be used to compute a distance between every two consecutive peaks in the wellbore. A resulting distribution histogram may indicate a median value of the distribution. Tubular joints having a small size may be discarded and joints having a large size may be processed, such as to check if a connection collar has been missed. Thereafter, a width of the connection collar may be detected through computation of a smoothed, one dimensional, signal peak width. Another approach to detect connection collars may include training (i.e., teaching) an AI model to detect the connection collars by feeding one or more of the controllers 140, 142, 144 images containing labeled connection collars and then using the trained AI model to recognize connection collars in future input images.

After the one or more of the controllers 140, 142, 144 determine (310) the background image 466, one or more of the controllers 140, 142, 144 may then determine (312) a defect image 468 based on a difference between the input image and the background image. The defect image may be determined (312) by subtracting the macro data in the background image 466 from the macro and micro data in the input image 464. The defect image 468 may comprise micro data that is indicative of the characteristic of the tubular structure 402 associated with defects in the tubular structure 402. For example, the micro data may be indicative of variations in wall thickness 416 of the tubular structure 402 caused by defects in the tubular structure 402. Because the micro data in the defect image 468 is indicative of defects in the tubular structure 402, such micro data may be referred to as defect data. Also, because the defect image 468 contains a difference or error between the input image 464 and the background image 466, the defect image 468 may be referred to as "an error image" or "an error map."

The determining (310) of the background image 466 and/or the determining (312) of the defect image 468 may be performed on a joint-by-joint basis, such as if the connection collar detection method has been applied to remove (308) the input data indicative of the characteristic of the tubular structure 402 associated with the connection collars. However, the determining (310) of the background image 466 and/or the determining (312) of the defect image 468 may be performed simultaneously on the plurality of tubular joints forming the whole tubular structure 402, such as if the connection collar detection method has not been applied to remove (308) the data indicative of the characteristic of the tubular structure 402 associated with the connection collars.

Certain non-localized defects may be mistaken by one or more of the controllers 140, 142, 144 as macro data indicative of a characteristic of the tubular structure 402 associated with the manufacturing patterns of the tubular structure 402. Such non-localized defects may be detected using a parallel approach based on an initial input image 464. Such non-localized defects may include, for example, long axial (or vertical) grooves, such as can be caused by friction by a cable on an inner surface of the tubular structure 402. An example of such non-localized defect may be or comprise the non-localized defect having a relatively thin, elongated, and substantially axially-extending geometry, as indicated by region 450 shown in the input image 444 in FIG. 12.

A supervised AI modeling method may be used to identify input data (or portions of the input image 464) associated with such non-localized defects. For example, an AI model may be trained to detect such non-localized defect in the tubular structure 402 by feeding one or more of the controllers 140, 142, 144 input images containing such non-localized defects that are labeled and then using the trained AI model to identify such non-localized defects on future input images. An AI model may also or instead be used to detect other types of defects. Thus, the determining (310) of the background image 466 may be used for localized defects, and the method (300) may further comprise using a trained AI model to analyze the input image 464 to recognize the input data indicative of the predetermined characteristic of the tubular structure associated with non-localized defects in the tubular structure 402.

Figure 15:
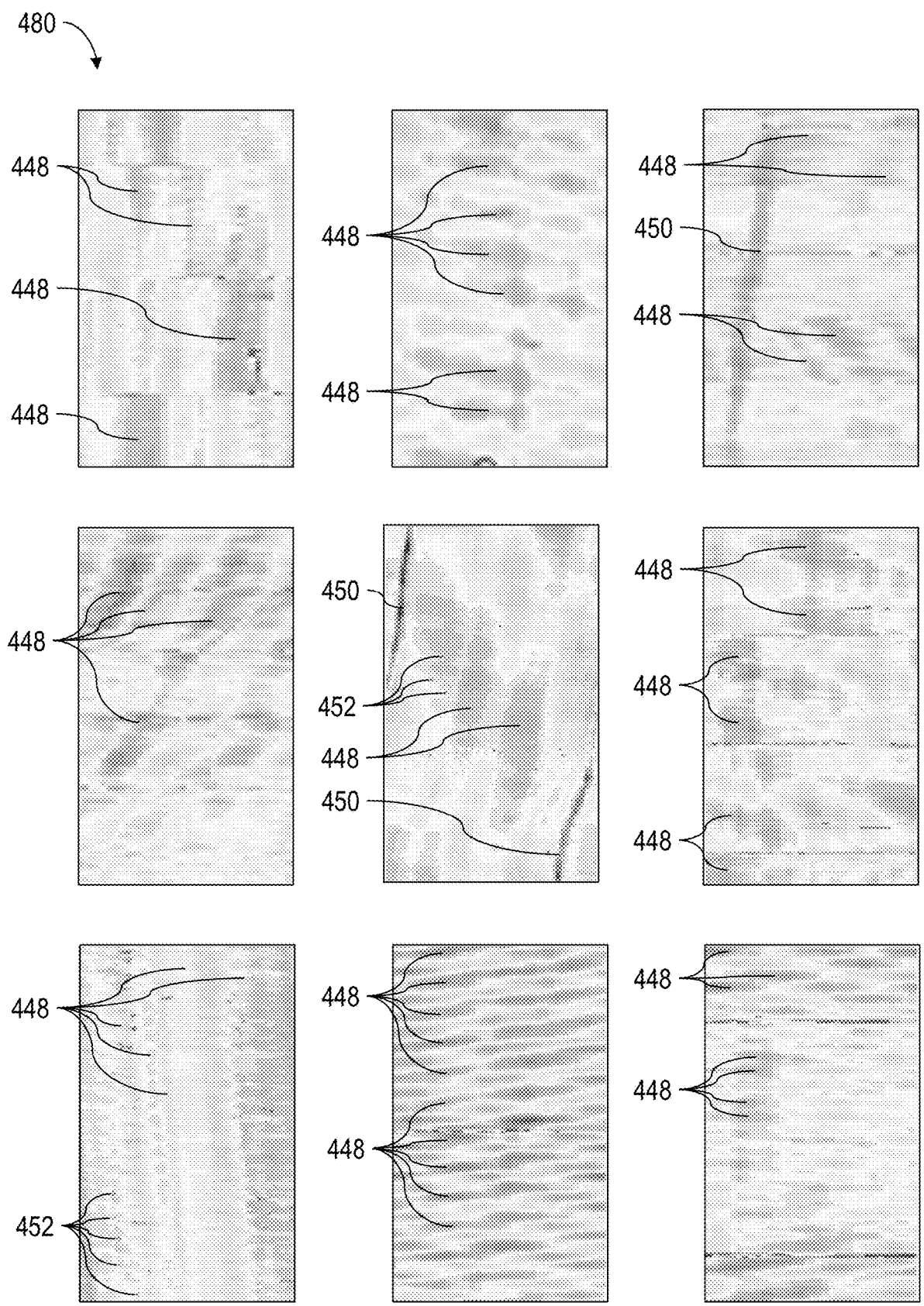

FIG. 15 is a plurality (e.g., a database) of input images 480, each comprising various input data (including macro and micro data). The input data comprises regions 448, 452 indicative of localized defects and regions 450 indicative of non-localized defects. Each of the regions 448, 450, 452 have been labeled with a corresponding type of defect. The input images 480 may be feed into and analyzed by a training processing device (e.g., the processing device 400) to thereby train an AI model. The trained AI model may then be uploaded to, stored by, or accessed by one or more of the controllers 140, 142, 144 and, thus, permit one or more of the controllers 140, 142, 144 to analyze future input images to differentiate between (or separate the input data into) macro data (including manufacturing patterns) and micro data (including localized defects and non-localized defects).

Defects caused by wear, decay, erosion, corrosion, and/or other means that cause loss or deformation of metal can have very different shapes and sizes, which may limit the accuracy of the AI model. Training (or building) an AI model would mandate a significant labelling effort to include a complete overview of each type of defect. Thus, an unsupervised AI modeling method may be utilized. The forte of unsupervised background reconstruction to determine (310) the background image 466 is its adaptation to different input types, without modifying the input data in the input image or labelling the input data in the input image.

The method (300) may further comprise determining (318) a segmentation map 470 based on the defect image 468. The segmentation map 470 may comprise segmentation data indicative of shape and/or location of the defects in the tubular structure 402. Determining (318) the segmentation map may comprise performing (320) statistical analysis of the defect data of the defect image 468 to generate the segmentation map 470. The statistical analysis may include thresholding, z-scoring based on standard deviation, and/or performing similarity searches. Determining (318) the segmentation map may also or instead comprise using (322) a trained AI model to analyze the defect data of the defect image 468 to generate the segmentation map 470. Determining (318) the segmentation map may include training the AI model to detect the shape and/or location of the defects in the tubular structure 402 by feeding the training processing device defect images containing labeled defects (including shape and/or location of the defects), then uploading the trained AI model to one or more of the controllers 140, 142, 144, and then using the trained AI model by one or more of the controllers 140, 142, 144 to determine (318) the segmentation map based on future defect images.

The method (300) may incorporate a multi-scale approach, wherein during AI model training, the training processing device may contain the plurality 480 (e.g., a database) of input images 464 of tubular structures 402 from different wells with various resolutions (depending on the tool sampling rate). Therefore, it is possible to set up two predictive models, each having an input image 464 determined at a different resolution. Training such models may include training an AI model on an autoencoder and/or providing statistical analysis (and/or filtering methods) specific to the resolution of each input image 464. Such training may permit the AI models to reconstruct the input images 464 as background images 466 regardless of the image resolution. Furthermore, the training of the AI model may include the use of two sliding windows to improve predictions by the models and include a perceptual loss for the training. Therefore, when two AI models are trained, each with a specific image input resolution, the lower resolution model may use classical loss, whereas the higher resolution AI model may use an additional perceptual loss to capture more elongated and large features. During operations (i.e., a prediction phase), each AI model (each taking as input corresponding image resolution) may be used to determine (310) a corresponding background image 466 based on the corresponding input image 464, determine (312) a corresponding defect image 468 based on the corresponding background image 466, and determine (318) a corresponding segmentation map 470 based on the corresponding defect image 468. The two segmentation maps 470 may then be combined to form a single segmentation map 470 comprising combined segmentation data indicative of at least one of shape and location of the defects in the tubular structure 402. Determining (318) a first segmentation map 470 may use a first statistical analysis or AI model, and determining (318) a second segmentation map 470 may use a second statistical analysis or AI model.

When a plurality of defects in the tubular structure 402 are sufficiently close (azimuthally and/or axially) to each other, such cluster of defects can degrade strength (e.g., burst pressure) of the tubular structure 402 more than when such defects are spaced apart. Thus, after the segmentation map 470 is generated, one or more of the controllers 140, 142, 144 may find (324) a cluster of defects in the segmentation map 470 based on individual size and relative proximity of the defects, and then classify (326) such cluster of defects as one of a plurality of predefined defect types. For example, one or more of the controllers 140, 142, 144 may find (324) a cluster of defects based on standards and rules set by agencies or organizations, such as the American Petroleum Institute (API), the American Society of Mechanical Engineers (ASME), and/or the National Association of Corrosion Engineers (NACE). Finding (324) the cluster of defects may include finding image pixels associated with defects on the segmentation map 470, encompassing individual or a group of image pixels associated with a plurality of closely spaced defects within rectangles, determining if the rectangles intersect with each other, and converting the size of individual defects from image pixels to actual units of length. Such procedure may be performed automatically by one or more of the controllers 140, 142, 144, such as by filling an adjacency matrix representing a finite graph and by computing the associated connected components. Each connected component may correspond to a cluster of defects that is also analyzed using its length and width. A cluster of defects may be classified (326) by comparing its geometrical characteristics to defect types published, listed, or otherwise predefined by agencies or organizations, such as API, ASME, and/or NACE. The recognized defect types may include, for example, pin holes, pitting, axial or circumferential slotting, axial or circumferential grooving, and/or extended corrosion.

After the segmentation map 470 is generated, one or more of the controllers 140, 142, 144 may determine (328) the strength and/or remaining operational life of the tubular structure 402 based on the segmentation data of the segmentation map 470 indicative of at least one of shape and location of the defects in the tubular structure 402, such as to ensure the integrity of the tubular structure 402 during operations. For example, one or more of the controllers 140, 142, 144 may combine dimensions (e.g., length, width, and/or depth) of the defects with known characteristics (e.g., dimensions, grade, and/or strength) of the tubular structure 402 to estimate its remaining strength. One or more of the controllers 140, 142, 144 may determine (328) the strength of the tubular structure, for example, based on standards and rules set by agencies or organizations, such as API, ASME, and/or NACE.

As described above, one or more portions of the method (300) may be extended to various imaging tools 400 (e.g., mechanical, electromagnetic, and/or acoustic), use image data having different resolutions, and take as input different channels. Furthermore, the method (300) may be a fit-for-well or fit-for-basin method that can be customized for a new imaging tool and image data, such as by generating (304) a new input image based on the new image data, determining (310) a new background image (e.g., retraining AI models), determining (312) a new defect image, determining (318) a new segmentation map, and applying defect clustering (324), defect classification (326), and strength determination (328) according to the basin or geography specific measures and rules. Also, one or more portions of the method (300) may be performed in real time by one or more of the controllers 140, 142, 144 while the imaging tool 400 is measuring predetermined characteristics of the downhole tubular structure 402. One or more portions of the method (300) may instead be performed as a post-processing operation, whereby one or more of the controllers 142, 144 perform one or more portions of the method (300) based on recorded image data that has been transmitted to and/or recorded by the one or more of the controllers 142, 144 after the imaging tool 400 finished measuring the predetermined characteristics of the downhole tubular structure 402.

In view of the entirety present disclosure, including the figures and the claims, a person having ordinary skill in the art will readily recognize that the present disclosure introduces a method comprising: receiving an input image of a tubular structure installed in a wellbore extending into a subterranean formation, wherein the input image comprises input data indicative of a characteristic of the tubular structure; determining a background image based on the input image, wherein the background image comprises background data indicative of the characteristic of the tubular structure associated with manufacturing of the tubular structure; and determining a defect image based on a difference between the input image and the background image, wherein the defect image comprises defect data indicative of the characteristic of the tubular structure associated with defects in the tubular structure.

The method may further comprise determining a segmentation map based on the defect image, wherein the segmentation map comprises segmentation data indicative of at least one of shape and location of the defects in the tubular structure. Determining the segmentation map may comprise at least one of: performing statistical analysis on the defect data of the defect image; and using a trained artificial intelligence model to analyze the defect data of the defect image. The method may further comprise determining strength of the tubular structure based on the segmentation data.

Determining the background image may comprise: finding the input data indicative of the characteristic of the tubular structure that is statistically representative of the input image; and removing from the input image the input data indicative of the characteristic of the tubular structure that is statistically rare in the input image.

The defects may comprise metal loss in the tubular structure caused by at least one of wear and corrosion.

The method may further comprise utilizing at least one downhole ultrasonic imaging tool to facilitate the input image.

The method may further comprise utilizing at least one downhole electromagnetic imaging tool to facilitate the input image.

The method may further comprise utilizing at least one downhole mechanical caliper imaging tool to facilitate the input image.

The characteristic of the tubular structure may be or comprise azimuthal and axial variations of inner radius of the tubular structure.

The characteristic of the tubular structure may be or comprise azimuthal and axial variations of wall thickness of the tubular structure.

The tubular structure may comprise a plurality of tubular joints each coupled end-to-end by a corresponding connection collar, and the method may further comprise, prior to determining the background image, pre-processing the input image to remove the input data indicative of the characteristic of the tubular structure associated with the connection collars.

The tubular structure may comprise a plurality of tubular joints each coupled end-to-end by a corresponding connection collar, wherein one or more of determining the background image and determining the defect image may be performed on a joint-by-joint basis.

The tubular structure may comprise a plurality of tubular joints each coupled end-to-end by a corresponding connection collar, wherein one or more of determining the background image and determining the defect image may be performed on the plurality of the tubular joints simultaneously.

The method may further comprise: finding clusters of the defects in the segmentation map based on individual size and relative proximity of the defects; and classifying each cluster as one of a plurality of predefined defect types. The predefined defect types may comprise pin hole defects, pitting defects, axial slotting defects, circumferential slotting defects, axial grooving defects, circumferential grooving defects, and extended corrosion defects.

The defects may be or comprise first defects and the method may further comprise using a trained artificial intelligence model to analyze the input image to recognize the input data indicative of the characteristic of the tubular structure associated with second defects in the tubular structure. The first defects may be localized defects and the second defects may be non-localized defects. The method may further comprise: labelling the second defects in a plurality of training input images; and training the artificial intelligence model using the labeled training input images.

The input image may be a first input image, the input data may be a first input data having a first resolution, the background image may be a first background image, the background data may be a first background data, the defect image may be a first defect image, the defect data may be a first defect data, and the method may further comprise: receiving a second input image of the tubular structure, wherein the second input image comprises second input data indicative of the characteristic of the tubular structure and having a second resolution; determining a second background image based on the second input image, wherein the second background image comprises second background data indicative of the characteristic of the tubular structure associated with manufacturing of the tubular structure; determining a second defect image based on a difference between the second input image and the second background image, wherein the second defect image comprises second defect data indicative of the characteristic of the tubular structure associated with defects in the tubular structure; determining a first segmentation map based on the first defect image, wherein the first segmentation map comprises first segmentation data indicative of at least one of shape and location of the defects in the tubular structure; determining a second segmentation map based on the second defect image, wherein the second segmentation map comprises second segmentation data indicative of the at least one of shape and location of the defects in the tubular structure; and combining the first and second segmentation maps to form a third segmentation map, wherein the third segmentation map comprises third segmentation data indicative of the at least one of shape and location of the defects in the tubular structure. Determining the first segmentation map may use a first statistical analysis or artificial intelligence model and determining the second segmentation map may use a second statistical analysis or artificial intelligence model.

The present disclosure also introduces an apparatus comprising a processing system that comprises a processor and a memory storing a computer program code. When executed by the processor, the computer program code causes the processing system to: receive an input image of a tubular structure installed in a wellbore extending into a subterranean formation, wherein the input image comprises input data indicative of a characteristic of the tubular structure; determine a background image based on the input image, wherein the background image comprises background data indicative of the characteristic of the tubular structure associated with manufacturing of the tubular structure; and determine a defect image based on a difference between the input image and the background image, wherein the defect image comprises defect data indicative of the characteristic of the tubular structure associated with defects in the tubular structure.

The computer program code may further cause the processing system to determine a segmentation map based on the defect image, wherein the segmentation map comprises segmentation data indicative of at least one of shape and location of the defects in the tubular structure. Determining the segmentation map may comprise at least one of: performing statistical analysis on the defect data of the defect image; and using a trained artificial intelligence model to analyze the defect data of the defect image. The computer program code may further cause the processing system to determine strength of the tubular structure based on the segmentation data.

Determining the background image may comprise: finding the input data indicative of the characteristic of the tubular structure that is statistically representative of the input image; and removing from the input image the input data indicative of the characteristic of the tubular structure that is statistically rare in the input image.

The defects may comprise metal loss in the tubular structure caused by at least one of wear and corrosion.

The apparatus may further comprise at least one downhole ultrasonic imaging tool operable to facilitate the input image.

The apparatus may further comprise at least one downhole electromagnetic imaging tool operable to facilitate the input image.

The apparatus may further comprise at least one downhole mechanical caliper imaging tool operable to facilitate the input image.

The characteristic of the tubular structure may be or comprise azimuthal and axial variations of inner radius of the tubular structure.

The characteristic of the tubular structure may be or comprise azimuthal and axial variations of wall thickness of the tubular structure.

The tubular structure may comprise a plurality of tubular joints each coupled end-to-end by a corresponding connection collar, and the computer program code may further cause the processing system to, prior to determining the background image, pre-process the input image to remove the input data indicative of the characteristic of the tubular structure associated with the connection collars.

The tubular structure may comprise a plurality of tubular joints each coupled end-to-end by a corresponding connection collar, wherein one or more of determining the background image and determining the defect image may be performed on a joint-by-joint basis.

The tubular structure may comprise a plurality of tubular joints each coupled end-to-end by a corresponding connection collar, wherein one or more of determining the background image and determining the defect image may be performed on the plurality of the tubular joints simultaneously.

The computer program code may further cause the processing system to: find clusters of the defects in the segmentation map based on individual size and relative proximity of the defects; and classify each cluster as one of a plurality of predefined defect types.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the spirit and scope of the present disclosure, and that they may make various changes, substitutions, and alterations herein without departing from the scope of the present disclosure.

The abstract at the end of this disclosure is provided to permit the reader to quickly ascertain the nature of the technical disclosure. It is submitted with the understanding that it will not be used to interpret or limit the scope or meaning of the claims.

What is claimed is:

1. A method comprising:
   receiving an input image of a tubular structure installed in a wellbore extending into a subterranean formation, wherein the input image comprises input data indicative of a characteristic of the tubular structure;
   determining a background image based on the input image, wherein the background image comprises background data indicative of the characteristic of the tubular structure associated with manufacturing of the tubular structure; and
   determining a defect image based on a difference between the input image and the background image, wherein the defect image comprises defect data indicative of the characteristic of the tubular structure associated with defects in the tubular structure.

2. The method of claim 1 further comprising determining a segmentation map based on the defect image, wherein the segmentation map comprises segmentation data indicative of at least one of shape and location of the defects in the tubular structure.

3. The method of claim 2 wherein determining the segmentation map comprises at least one of:
   performing statistical analysis on the defect data of the defect image; and
   using a trained artificial intelligence model to analyze the defect data of the defect image.

4. The method of claim 2 further comprising determining strength of the tubular structure based on the segmentation data.

5. The method of claim 1 wherein determining the background image comprises:
   finding the input data indicative of the characteristic of the tubular structure that is statistically representative of the input image; and
   removing from the input image the input data indicative of the characteristic of the tubular structure that is statistically rare in the input image.

6. The method of claim 1 wherein the defects comprise metal loss in the tubular structure caused by at least one of wear and corrosion.

7. The method of claim 1 further comprising utilizing at least one downhole ultrasonic imaging tool to facilitate the input image.

8. The method of claim 1 further comprising utilizing at least one downhole electromagnetic imaging tool to facilitate the input image.

9. The method of claim 1 further comprising utilizing at least one downhole mechanical caliper imaging tool to facilitate the input image.

10. The method of claim 1 wherein the characteristic of the tubular structure is or comprises at least one of:
    azimuthal and axial variations of inner radius of the tubular structure; and
    azimuthal and axial variations of wall thickness of the tubular structure.

11. An apparatus comprising:
    a processing system comprising a processor and a memory storing a computer program code, which when executed by the processor, causes the processing system to:
    receive an input image of a tubular structure installed in a wellbore extending into a subterranean formation, wherein the input image comprises input data indicative of a characteristic of the tubular structure;
    determine a background image based on the input image, wherein the background image comprises background data indicative of the characteristic of the tubular structure associated with manufacturing of the tubular structure; and
    determine a defect image based on a difference between the input image and the background image, wherein the defect image comprises defect data indicative of the characteristic of the tubular structure associated with defects in the tubular structure.

12. The apparatus of claim 11 wherein the computer program code further causes the processing system to determine a segmentation map based on the defect image, wherein the segmentation map comprises segmentation data indicative of at least one of shape and location of the defects in the tubular structure.

13. The apparatus of claim 12 wherein determining the segmentation map comprises at least one of:
    performing statistical analysis on the defect data of the defect image; and using a trained artificial intelligence model to analyze the defect data of the defect image.

14. The apparatus of claim 12 wherein the computer program code further causes the processing system to determine strength of the tubular structure based on the segmentation data.

15. The apparatus of claim 11 wherein determining the background image comprises:
finding the input data indicative of the characteristic of the tubular structure that is statistically representative of the input image; and
removing from the input image the input data indicative of the characteristic of the tubular structure that is statistically rare in the input image.

16. The apparatus of claim 11 wherein the defects comprise metal loss in the tubular structure caused by at least one of wear and corrosion.

17. The apparatus of claim 11 further comprising at least one downhole ultrasonic imaging tool operable to facilitate the input image.

18. The apparatus of claim 11 further comprising at least one downhole electromagnetic imaging tool operable to facilitate the input image.

19. The apparatus of claim 11 further comprising at least one downhole mechanical caliper imaging tool operable to facilitate the input image.

20. The apparatus of claim 11 wherein the characteristic of the tubular structure is or comprises at least one of:
azimuthal and axial variations of inner radius of the tubular structure; and
azimuthal and axial variations of wall thickness of the tubular structure.

* * * * *